(12) United States Patent
Patil et al.

(10) Patent No.: US 8,322,275 B2
(45) Date of Patent: *Dec. 4, 2012

(54) TOP AND TAIL SYSTEM FOR LEAFY VEGETABLES

(75) Inventors: Narayan Dnyanadeo Patil, King City, CA (US); Serafin Albarran, Salinas, CA (US); William Christopher Johnson, Yuma, AZ (US)

(73) Assignee: Dole Fresh Vegetables, Inc., Salinas, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 12/841,954

(22) Filed: Jul. 22, 2010

(65) Prior Publication Data

US 2010/0285194 A1 Nov. 11, 2010

Related U.S. Application Data

(60) Continuation of application No. 12/501,791, filed on Jul. 13, 2009, now Pat. No. 7,763,299, which is a division of application No. 11/139,464, filed on May 26, 2005, now Pat. No. 7,559,275.

(51) Int. Cl.
*B65D 7/08* (2006.01)
(52) U.S. Cl. ............... 99/537; 99/567; 99/635; 99/643; 83/869; 83/401; 83/409; 83/731; 83/327.1
(58) Field of Classification Search ............ 99/537, 99/567, 635, 643; 83/869, 401, 409, 731; 56/327.1
See application file for complete search history.

(56) References Cited

U.S. PATENT DOCUMENTS

| | | | |
|---|---|---|---|
| 2,453,040 A | 11/1948 | Sharma | |
| 2,698,804 A | 1/1955 | Crisafulli et al. | |
| 3,391,718 A | 7/1968 | Cooke et al. | |
| 3,587,203 A | 6/1971 | Miles | |
| 3,652,300 A | 3/1972 | Sharma | |
| 3,768,101 A | 10/1973 | Kuts | |

(Continued)

FOREIGN PATENT DOCUMENTS

FR 2305137 A1 10/1976

(Continued)

OTHER PUBLICATIONS

Notice of Allowance received for U.S. Appl. No. 12/501,791, mailed on Mar. 19, 2010, 10 pages.

(Continued)

*Primary Examiner* — Anthony Weier
(74) *Attorney, Agent, or Firm* — Morrison & Foerster LLP (57) ABSTRACT

A leafy vegetable having a core end and a leafy end is processed after being harvested. The harvested leafy vegetable is transported to a trim area on a conveyor. A first cutting implement located in the trim area trims a portion of the core end. A second cutting implement located in the trim area trims a portion of the leafy end. The first and second cutting implements are spaced a set distance apart, which defines an amount of the leafy vegetable remaining after the portions of the core and leafy ends are trimmed. As the portions of the core and leafy ends of the leafy vegetable are being trimmed by the first and second cutting implements, a set of one or more nozzles located in the trim area sprays a rinsing liquid on cut sites on the leafy vegetable to rinse off natural juices exuding from the cut sites.

14 Claims, 9 Drawing Sheets

U.S. PATENT DOCUMENTS

| | | | |
|---|---|---|---|
| 3,807,657 | A | 4/1974 | Brill |
| 3,814,820 | A * | 6/1974 | Busta et al. .................. 426/262 |
| 3,949,630 | A | 4/1976 | Winkel |
| 4,001,443 | A | 1/1977 | Dave |
| 4,036,123 | A | 7/1977 | Conkey |
| 4,552,526 | A | 11/1985 | Hafele |
| 4,711,789 | A | 12/1987 | Orr et al. |
| 4,753,808 | A | 6/1988 | Orr et al. |
| 4,846,914 | A | 7/1989 | Woodrich |
| 4,949,612 | A | 8/1990 | Julian |
| 5,074,039 | A | 12/1991 | Hillbish et al. |
| 5,126,153 | A | 6/1992 | Beck |
| 5,146,734 | A | 9/1992 | Smyczek |
| 5,249,492 | A | 10/1993 | Brown et al. |
| 5,316,778 | A | 5/1994 | Hougham |
| RE34,678 | E | 8/1994 | Fischer et al. |
| 5,528,967 | A | 6/1996 | Maroney |
| 5,558,666 | A | 9/1996 | Dewey et al. |
| 5,560,190 | A | 10/1996 | Ottaway |
| 5,752,949 | A | 5/1998 | Tankovich et al. |
| 5,776,175 | A | 7/1998 | Eckhouse et al. |
| 5,783,229 | A | 7/1998 | Manlove |
| 5,795,535 | A | 8/1998 | Giovannone et al. |
| 5,916,354 | A | 6/1999 | Dragt |
| 5,925,395 | A | 7/1999 | Chen |
| 6,033,171 | A | 3/2000 | Doyle et al. |
| 6,050,073 | A | 4/2000 | Nevarez, Sr. |
| 6,054,160 | A | 4/2000 | Gawad et al. |
| 6,086,800 | A | 7/2000 | Manlove |
| 6,112,429 | A | 9/2000 | Mitchell et al. |
| 6,113,958 | A | 9/2000 | Saltveit et al. |
| 6,123,970 | A | 9/2000 | Dull |
| 6,149,644 | A | 11/2000 | Xie |
| 6,273,883 | B1 | 8/2001 | Furumoto |
| 6,308,600 | B1 | 10/2001 | Dragt |
| 6,413,556 | B1 | 7/2002 | Bathurst et al. |
| 6,467,248 | B2 | 10/2002 | Brown |
| 6,729,218 | B2 | 5/2004 | Somsen |
| 6,763,752 | B2 | 7/2004 | Marshall et al. |
| 6,843,049 | B2 | 1/2005 | Brown |
| 7,062,899 | B2 | 6/2006 | Maconachy et al. |
| 7,559,275 | B1 * | 7/2009 | Patil et al. ........................ 99/537 |
| 2002/0164407 | A1 | 11/2002 | Wolfe et al. |
| 2003/0036749 | A1 | 2/2003 | Durkin et al. |
| 2003/0177879 | A1 | 9/2003 | Abarzuza |
| 2004/0010300 | A1 | 1/2004 | Masotti et al. |
| 2004/0149545 | A1 | 8/2004 | Tarantino et al. |
| 2004/0187465 | A1 * | 9/2004 | Tarantino et al. ............ 56/327.1 |

FOREIGN PATENT DOCUMENTS

JP 8-336795 A 12/1996

OTHER PUBLICATIONS

Office Action for Canadian Patent Application No. 2,547,875, mailed on Apr. 16, 2012, 3 pages.

* cited by examiner

TOP AND TAIL SYSTEM FOR LEAFY VEGETABLES

CROSS-REFERENCE TO RELATED APPLICATION

This application is a Continuation application of U.S. patent application Ser. No. 12/501,791, entitled TOP AND TAIL SYSTEM FOR LEAFY VEGETABLES, filed on Jul. 13, 2009, which is a Divisional application of U.S. patent application Ser. No. 11/139,464, filed on May 26, 2005, (now U.S. Pat. No. 7,559,275, issued Jul. 14, 2009), all of which are incorporated herein by reference in their entirety for all purposes.

BACKGROUND

1. Field

The present application relates to processing of leafy vegetables, and, more particularly, to a top and tail system used to process harvested leafy vegetables.

2. Related Art

In commercial harvesting and processing of leafy vegetables (e.g., heads of Romaine lettuce), leafy vegetables are typically field harvested and transported to a processing plant to be processed for market. In the processing plant, portions of the leafy ends and core ends, which are also referred to as tops and tails, of the leafy vegetables are manually trimmed in trim lines. Alternatively, portions of the leafy ends and cored ends are manually trimmed in the field before the leafy vegetables are transported to the processing plant for further processing. In both cases, the leafy vegetables tend to discolor/pink due, in part, to the natural juices that exude from cut sites.

SUMMARY

In one exemplary embodiment, a leafy vegetable having a core end and a leafy end is processed after being harvested. The harvested leafy vegetable is transported to a trim area on a conveyor. A first cutting implement located in the trim area trims a portion of the core end. A second cutting implement located in the trim area trims a portion of the leafy end. The portion of the core end and the portion of the leafy end can be trimmed concurrently or at different time intervals. The first and second cutting implements are adjustable and can be spaced at a pre-selected gap setting to define an amount of the leafy vegetable remaining after the portions of the core and leafy ends are trimmed. As the portions of the core and leafy ends of the leafy vegetable are being trimmed by the first and second cutting implements, a set of one or more nozzles located in the trim area sprays a rinsing liquid on cut sites on the leafy vegetable to rinse off natural juices exuding from the cut sites. The rising liquid can also be sprayed on the first and second cutting implements to rinse off any exudates build up on the first and second cutting implements.

DESCRIPTION OF DRAWING FIGURES

The present application can be best understood by reference to the following description taken in conjunction with the accompanying drawing figures, in which like parts may be referred to by like numerals.

DETAILED DESCRIPTION

The following description sets forth numerous specific configurations, parameters, and the like. It should be recognized, however, that such description is not intended as a limitation on the scope of the present invention, but is instead provided as a description of exemplary embodiments.

Figure 1:
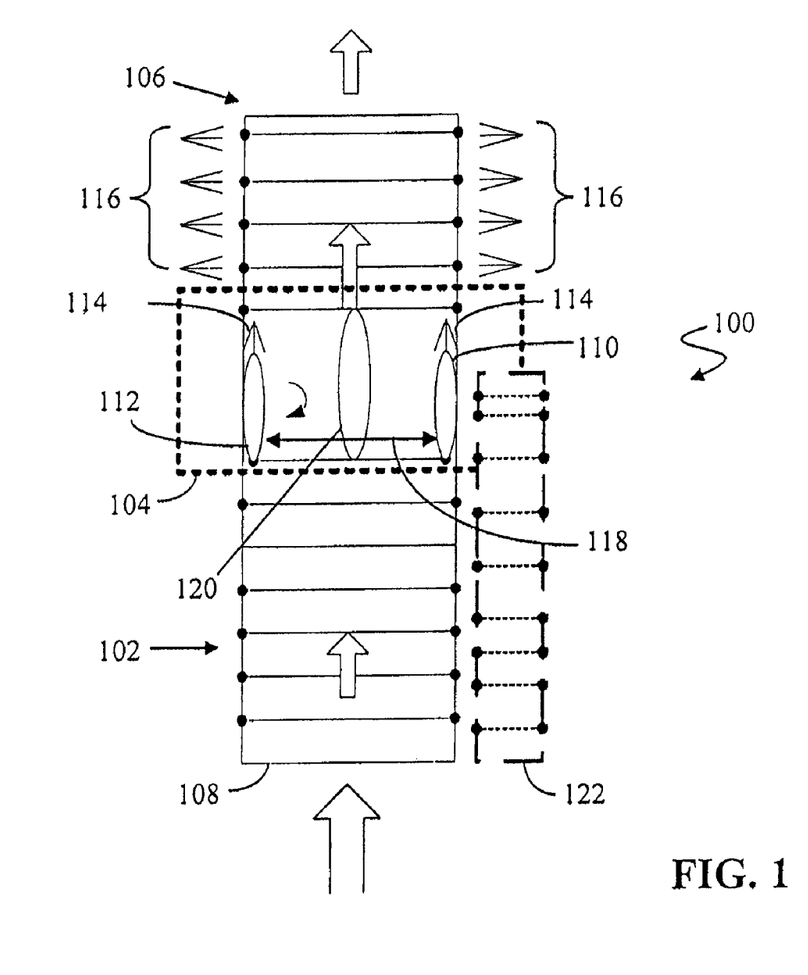
FIG. 1 is a schematic of an exemplary top and tail system.

With reference to FIG. 1, an exemplary top and tail system 100 is depicted. Top and tail system 100 is used to process a leafy vegetable, which has a core end and a leafy end, after the leafy vegetable is harvested. As will be described in more detail below, top and tail system 100 trims a portion of the core end and a portion of the leafy end of the leafy vegetable, and spray rinses off natural juices exuding from the cut sites.

Figure 2:
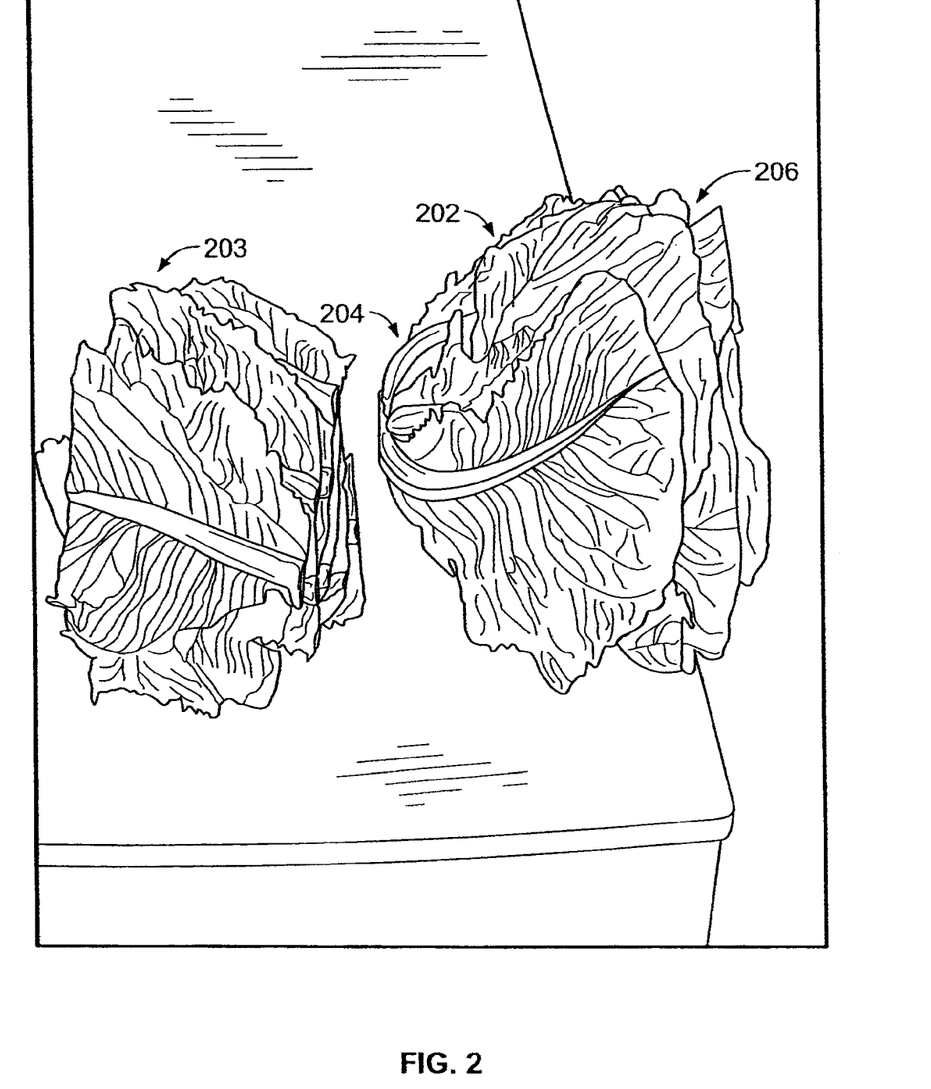
FIG. 2 depicts a head of Romaine lettuce before being processing and a head of Romaine lettuce after being processed using the exemplary top and tail system depicted in FIG. 1.

For example, with reference to FIG. 2, top and tail system 100 (FIG. 1) can be used to process a head of Romaine lettuce 202, which has a core end 204 and a leafy end 206. FIG. 2 depicts head of Romaine lettuce 202 before being processed in top and tail system 100 (FIG. 1). FIG. 2 also depicts a head of Romaine lettuce 203 after a portion of core end 204 and a portion of leafy end 206 have been trimmed by top and tail system 100 (FIG. 1). It should be recognized, however, that top and tail system 100 (FIG. 1) can be used to process any leafy vegetable having a core end and a leafy end.

With reference again to FIG. 1, in one exemplary embodiment, top and tail system 100 includes a load area 102, a trim area 104, and a post-trim area 106. In the present exemplary embodiment, a first conveyor 108 transports a leafy vegetable to be processed from load area 102 to trim area 104 and then to post-trim area 106. As will be described in more detail below, a roller 120 can be used to hold the leafy vegetable while it is trimmed at trim area 104. Additionally, a second conveyor 122 can be used to guide, hold, and orient the leafy vegetable for trimming at trim area 104.

In trim area 104, a first cutting implement 110 trims a portion of the core end of the leafy vegetable. A second cutting implement 112 trims a portion of the leafy end of the leafy vegetable. As depicted in FIG. 1, first and second cutting implements 110, 112 are adjustable, and can be spaced at a pre-set gap or distance 118 apart from each other. Distance 118, which is adjustable, defines an amount of the leafy vegetable remaining after the portions of the core and leafy ends are trimmed. Distance 118 can be adjusted depending on the size of the leafy vegetable and the amount to be trimmed.

As the portions of the core and leafy ends are being trimmed by the first and second cutting implements 110, 112, a set of one or more nozzles 114 located in trim area 104 sprays a rinsing liquid on cut sites on the leafy vegetable to rinse off natural juices exuding from the cut sites. By rinsing off the natural juices exuding from the cut sites as the portions of the core and leafy ends are being trimmed, the amount of discoloration/pinking can be reduced. Set of one or more nozzles 114 located in trim area 104 also can spray rinsing liquid on the first and second cutting implements 110, 112 to rinse off exudates build up on the first and second cutting implements 110, 112 to minimize cross contamination of trimmed leafy vegetables with exudates. The rinsing liquid can be any food grade sanitizing liquid, such as chlorinated water with 100 parts per million (ppm) chlorine. It should be recognized, however, that the concentration of the chlorinated water can vary, and that various types of rinsing liquids can be used.

Figure 3:
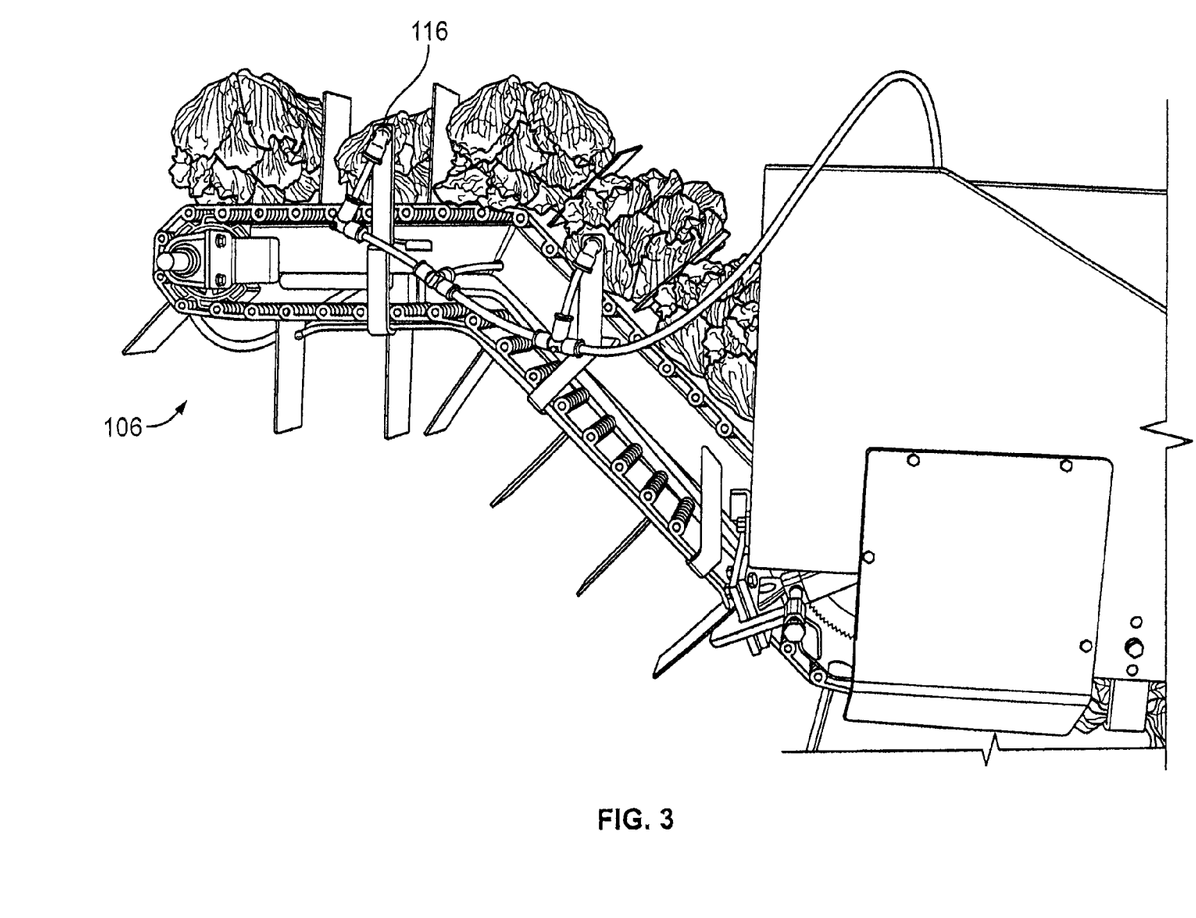
FIG. 3 is a side view of a portion of an exemplary top and tail system.

After a leafy vegetable has been trimmed at trim area 104, the trimmed leafy vegetable is transported through post-trim area 106, where another set of one or more nozzles 116 continues to spray rinse the cut sites on the leafy vegetable. For example, FIG. 3 depicts trimmed heads of Romaine lettuce moving through post-trim area 106, while rinsing liquid is applied to cut sites using set of one or more nozzles 116.

With reference to FIG. 1, in the present exemplary embodiment, first and second cutting implements 110, 112 simultaneously trim portions of the core and leafy ends. Additionally, as the first and second cutting implements 110, 112 trim portions of the core and leafy ends, set of one or more nozzles 114 simultaneously sprays rinsing liquid on the cut sites. It should be recognized, however, that first and second cutting implements 110, 112 can trim portions of the core and leafy ends at different times.

Figure 4:
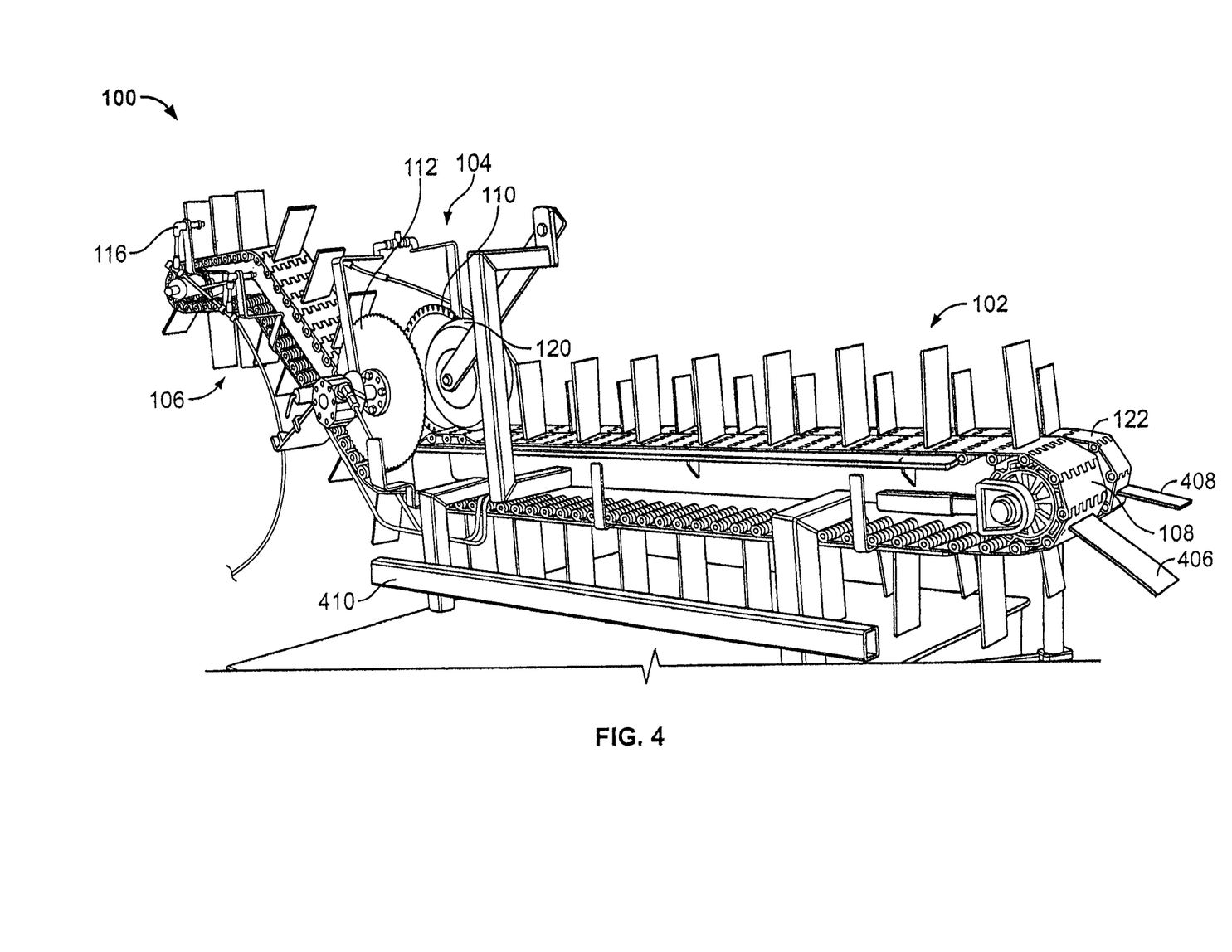
FIG. 4 is a perspective view of an exemplary top and tail system.
Figure 5:
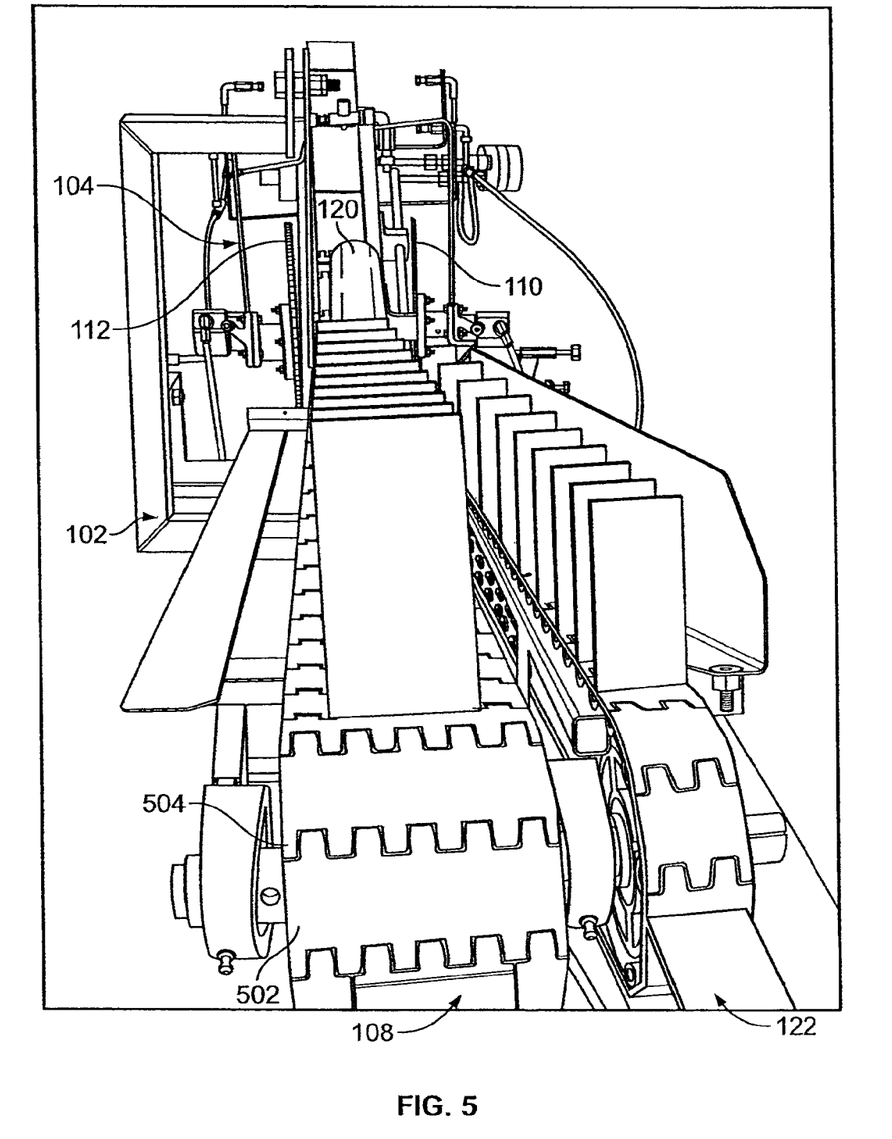
FIG. 5 is a front view of the exemplary top and tail system depicted in FIG. 4.
Figure 6:
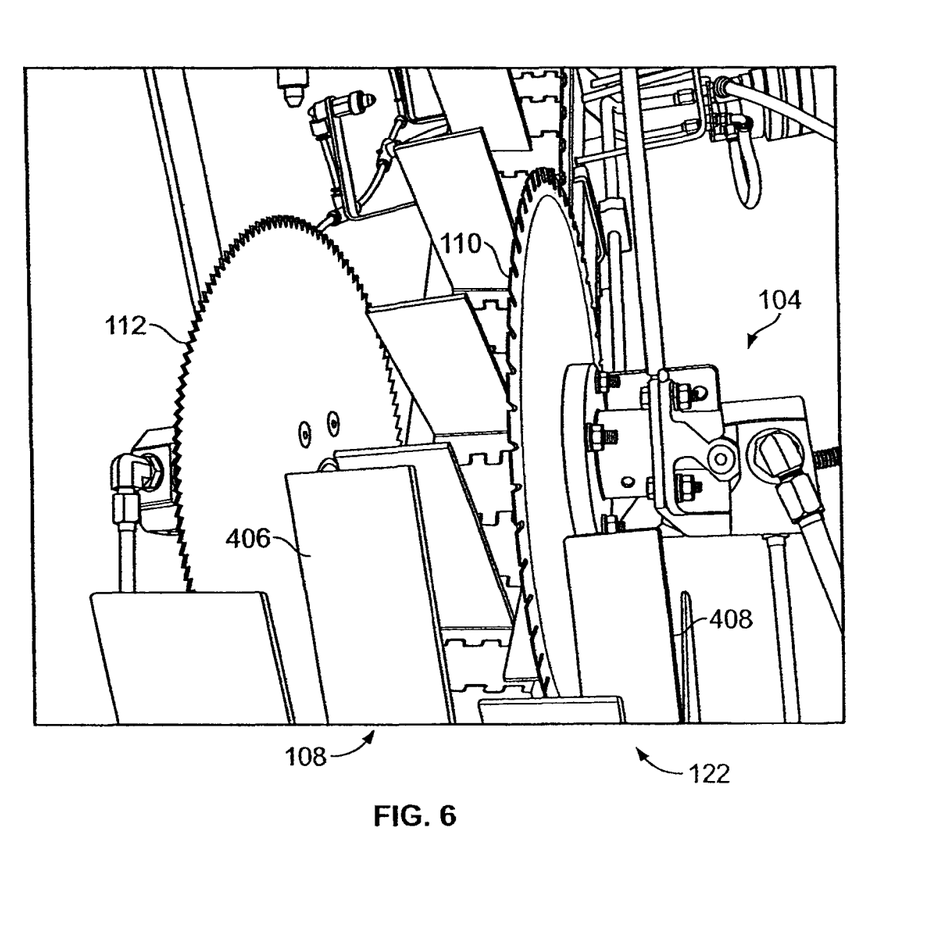
FIG. 6 is a perspective view of a portion of the exemplary top and tail system depicted in FIG. 4.

In FIGS. 1, 4-6, 8, and 9, first and second cutting implements 110, 112 are depicted as being circular saws. As depicted in FIG. 6, in the present exemplary embodiment, first cutting implement 110 can have teeth that are better suited to trim the core end, while second cutting implement 112 can have teeth that are better suited to trim the leafy end. It should be recognized, however, that first and second cutting implements 110, 112 can have various shapes, such as a flat knife, and cutting configurations, and can be various types of cutting implements, such as water knives.

Additionally, in FIGS. 1, 4-6, 8, and 9, first and second cutting implements 110, 112 are depicted as being circular saws vertically oriented. It should be recognized, however, that first and second cutting implements 110, 112 can be oriented at different angles or at offset angles.

In FIGS. 1, 4-6, 8, and 9, first cutting implement 110 is depicted as a single circular saw to trim the core end, and second cutting implement 112 is depicted as a single circular saw to trim the leafy end. It should be recognized, however, that first cutting implement 110 can be comprised of any number of saws, knives, and the like, and second cutting implement 112 can also be comprised of any number of saws, knives, and the like.

Figure 10:
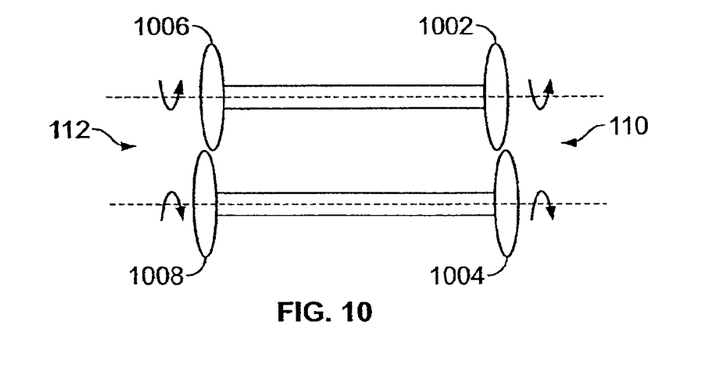
FIG. 10 is a schematic of exemplary cutting implements.

For example, with reference to FIG. 10, first cutting implement 110 can be a set of circular saws (i.e., circular saws 1002, 1004), and second cutting implement 112 can also be a set of circular saws (i.e., circular saws 1006, 1008). As depicted in FIG. 10, the sets of circular saws can rotate in opposite directions. In particular, circular saws 1002 and 1006 are depicted as rotating in a counter-clockwise direction, and circular saws 1004 and 1008 are depicted as rotating in a clockwise direction. It should be recognized, however, that the direction of rotation of the sets of circular saws can be reversed and adjusted for any rotational configurations within the set of saws and for the sets of saws. Additionally, the sets of circular saws can rotate in the same direction. The sets of circular saws can be oriented vertically, at different angles, or at offset angles. The gap between saws 1002 and 1006 and the gap between saws 1004 and 1008 can be adjusted.

With reference to FIG. 4, in the present exemplary embodiment, first conveyor 108 extends from load area 102, through trim area 104, to post-trim area 106. As depicted in FIG. 5, first conveyor 108 extends between first and second cutting implements 110, 112. With reference again to FIG. 4, in the present exemplary embodiment, first conveyor 108 is an endless belt that runs from load area 102 to post-trim area 106, and then returns to load area 102 in a continuous loop.

It should be recognized that any number of conveyors can be used to transport the leafy vegetable through spray rinse system 100. For instance, first conveyor 108 can be comprised of two or more successive conveyor belts. For example, one conveyor belt can extend from load area 102 to trim area 104, and another conveyor belt can extend from trim area 104 to post-trim area 106. The two belts can overlap vertically so that the trimmed leafy vegetable is transferred between the two conveyor belts by falling from the previous conveyor belt onto the subsequent conveyor belt.

Figure 7:
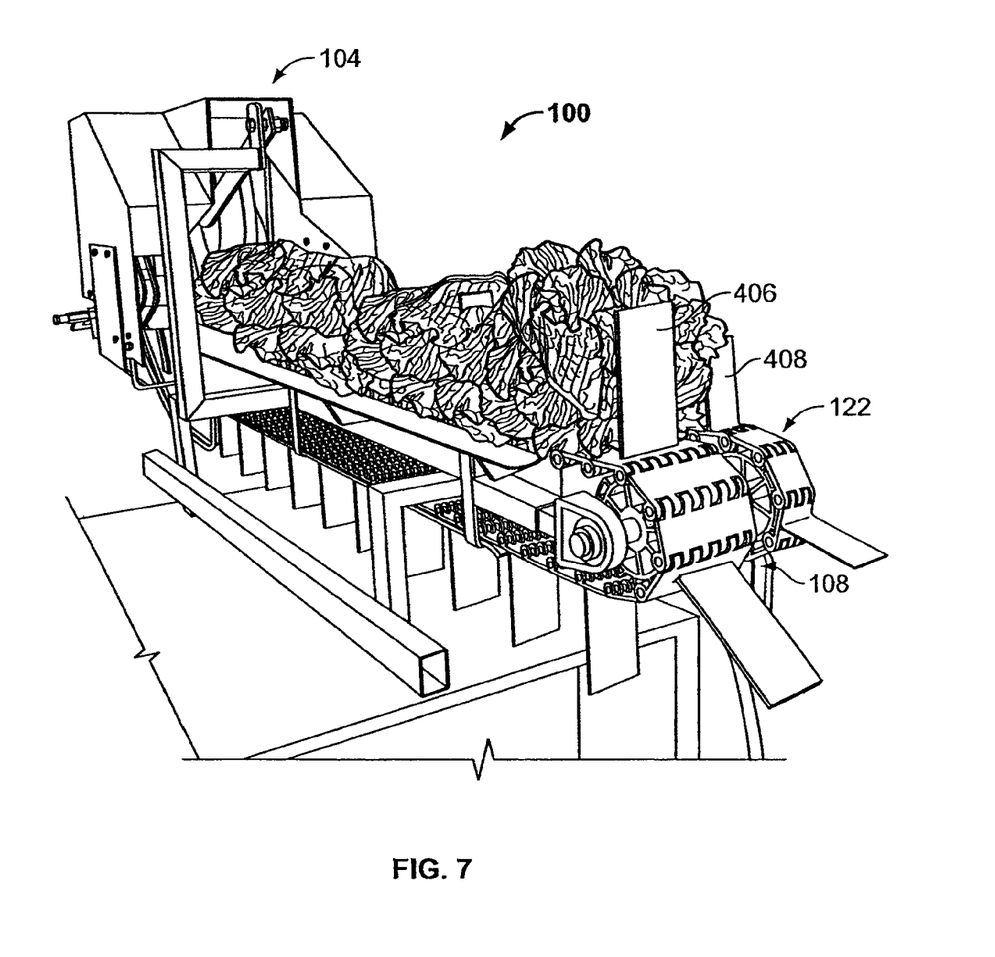
FIG. 7 is another perspective view of the exemplary top and tail system depicted in FIG. 4.

In the present exemplary embodiment, second conveyor 122 extends from load area 102 to trim area 104. With reference to FIG. 5, second conveyor 122 runs adjacent and parallel to first conveyor 108. With reference to FIG. 6, second conveyor 122 extends into trim area 104. As depicted in FIG. 7, second conveyor 122 holds, supports, and guides the portion of the core end of the leafy vegetable to be trimmed. Second conveyor 122 also prevents the leafy vegetable from being twisted while being transported to trim area 104 and trimmed at trim area 104.

With reference to FIG. 5, in the present exemplary embodiment, first and second conveyors 108, 122 are formed from sections of plastic plates 502 with hinged or flexible joints 504, similar to tank treads. It should be recognized, however, that first and second conveyors 108, 122 can be formed from various materials, such as rubber, metal, and the like, that are either food safe or treated to be food safe.

With reference again to FIG. 4, in the present exemplary embodiment, first conveyor 108 includes a first set of cleats 406, and second conveyor 122 includes a second set of cleats 408. As depicted in FIG. 7, a leafy vegetable is held between two of the first set of cleats 406 on first conveyor 108 and two of the second set of cleats 408 on second conveyor 122. In particular, a leafy vegetable to be processed is loaded onto first and second conveyors 108, 122 with the portion of the core end to be trimmed held between two of the second set of cleats 408 on second conveyor 122.

With reference to FIG. 6, as portions of the core and leafy ends are being trimmed by first and second cutting implements 110, 112, one of the first set of cleats 406 prevents the leafy vegetable from sliding on first conveyor 108. Similarly, as a portion of the core end is being trimmed by first cutting implement 110, one of the second set of cleats 408 prevents the portion of the core end being trimmed from sliding on second conveyor 122.

After the portion of the core end has been trimmed, the trimmed portion of the core end falls off the end of second conveyor 122. As described above, after the portions of the core and leafy ends have been trimmed, the remaining portion of the leafy vegetable is transported through post-trim area 106 (FIG. 1) on first conveyor 108.

With reference again to FIG. 4, in the present exemplary embodiment, first and second sets of cleats 406, 408 are formed from a flexible plastic material attached to first and second conveyors 108, 122. It should be recognized, however, that first and second sets of cleats 406, 408 can be rigid, and can be formed from various materials.

With reference to FIGS. 4 and 5, in the present exemplary embodiment, when a leafy vegetable is transported to trim area 104, roller 120 disposed above first conveyor 108 and between first and second cutting implements 110, 112, holds the leafy vegetable against first conveyor 108 as first and second cutting implements 110, 112 trim portions of the core end and leafy end, respectively. As depicted in FIGS. 4 and 5, roller 120 can be sized to fit between two adjacent cleats 408 on first conveyor 108. Roller 120 can be formed from flexible materials suitable for food contact, such as rubber. It should be recognized that any similar mechanism, such as a flat belt, can be used to hold the leafy vegetable against first conveyor 108 in trim area 104.

Figure 8:
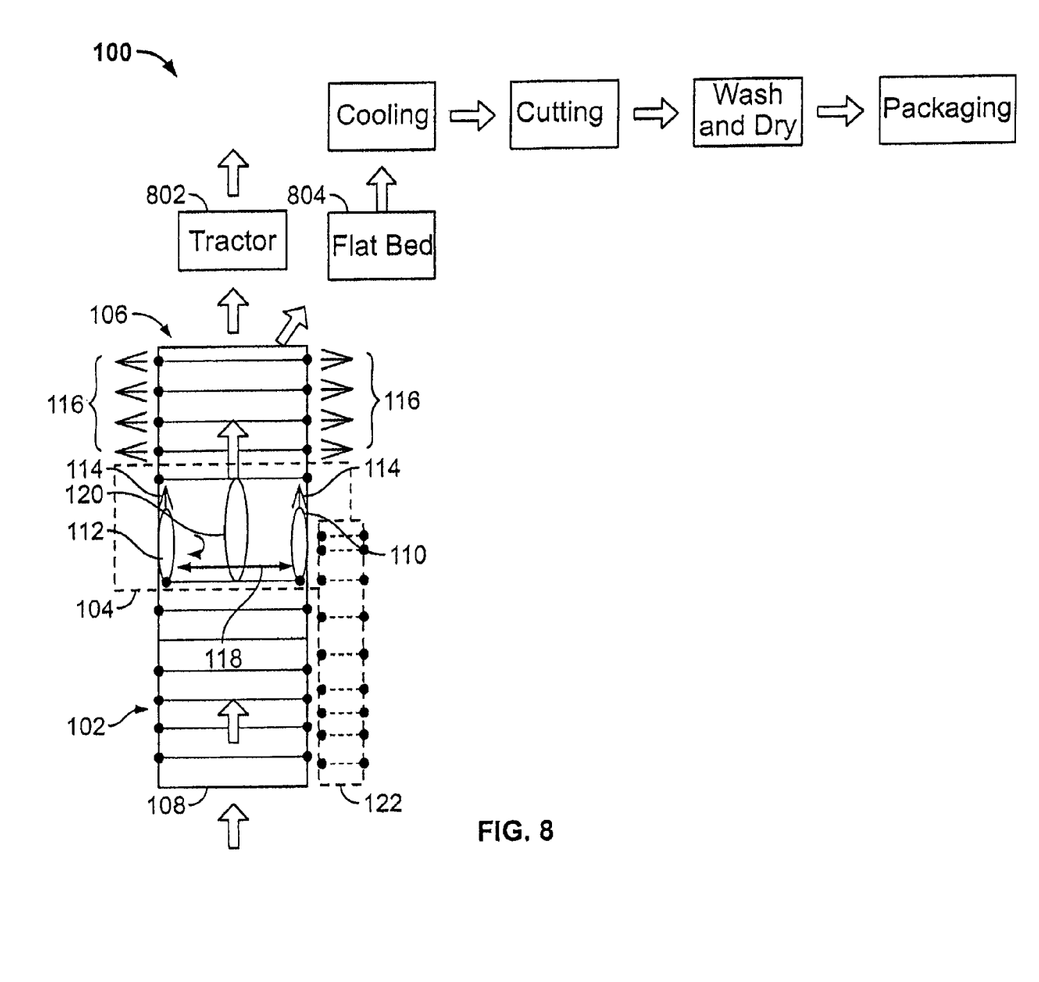
FIG. 8 is another schematic of an exemplary top and tail system attached to a tractor.

With reference to FIG. 4, in one exemplary embodiment, top and tail system 100 can be configured to be used in a field to process leafy vegetables as they are harvested in the field. In particular, components of top and tail system 100 (e.g., first conveyor 108, second conveyor 122, first cutting implement 110, second cutting implement 112, set of one or more nozzles 114, roller 120) are attached to a frame 410. With reference to FIG. 8, frame 410 (FIG. 4) is configured to be pulled by a tractor 802. Power needed to operate the components of top and tail system 100 can be provided from tractor 802 or a separate power supply attached to frame 410 (FIG. 4).

In the present exemplary embodiment, as top and tail system 100 is pulled through the field by tractor 802, whole leafy vegetable heads are harvested and loaded onto first conveyor 108 in load area 102. After portions of the core and leafy ends of the leafy vegetables are trimmed in trim area 104, the trimmed leafy vegetables can be transported from post-trim area 106 into bins on a flat bed 804. The trimmed leafy vegetables can then be transported to a processing plant for further processing. For example, as depicted in FIG. 8, the trimmed leafy vegetables can be cooled, further cut, washed and dried, then packaged for market.

Figure 9:
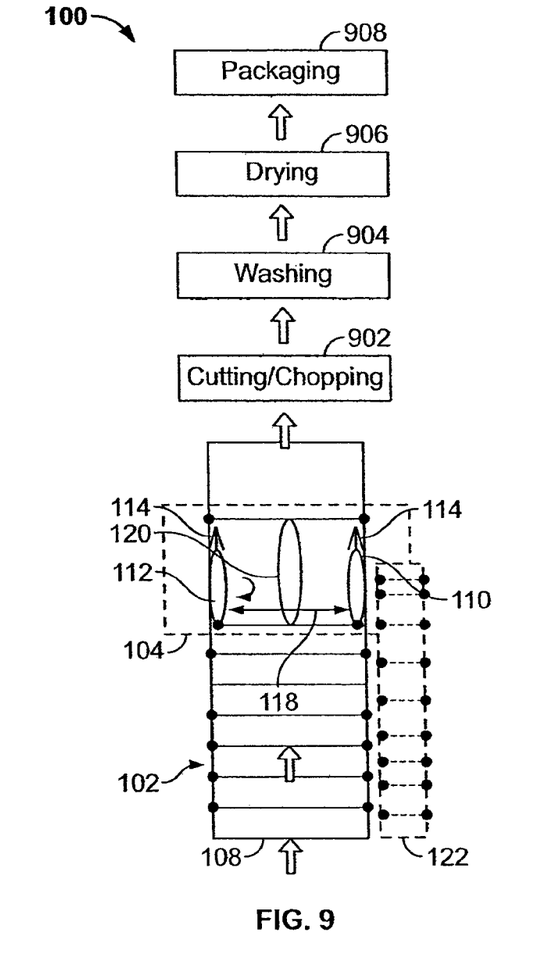
FIG. 9 is a schematic of a top and tail system integrated into a processing plant.

With reference to FIG. 9, in another exemplary embodiment, top and tail system 100 can be configured to be used in a processing plant to process field harvested leafy vegetables. In particular, components of top and tail system 100 (e.g., first conveyor 108, second conveyor 122, first cutting implement 110, second cutting implement 112, set of one or more nozzles 114, roller 120) are integrated into a processing line in a processing plant. Power needed to operate the components of top and tail system 100 can be provided by electrical or hydraulic power in the processing plant or similar sources.

In the present exemplary embodiment, whole leafy vegetable heads with core are harvested and transported to the processing plant for processing. The leafy vegetables can be cooled and staged for processing in the processing plant. When the leafy vegetables are ready to be processed, the leafy vegetables are loaded onto first conveyor 108 in load area 102. After portions of the core ends and leafy ends of the leafy vegetables are trimmed in trim area 104, and spray rinsed with a rinsing liquid, the trimmed leafy vegetables can be further processed in the processing plant. For example, the trimmed leafy vegetables can be further cut in cutting area 902, washed and dried in wash area 904, dry area 906, then packaged for market in packaging area 908.

The foregoing descriptions of specific embodiments have been presented for purposes of illustration and description. They are not intended to be exhaustive or to limit the invention to the precise forms disclosed, and it should be understood that many modifications and variations are possible in light of the above teaching.

We claim:

1. A system to process a leafy vegetable after being harvested, wherein the leafy vegetable has a core end and a leafy end, the system comprising:
    a conveyor to transport the leafy vegetables through a trim area;
    a first cutting implement located in the trim area to trim a portion of the core end;
    a second cutting implement located in the trim area to trim a portion of the leafy end, wherein the first and second cutting implements are spaced a set distance apart, and wherein the set distance defines an amount of the leafy vegetable remaining after the portions of the core and leafy ends are trimmed;
    a set of cleats disposed on the conveyor, wherein the leafy vegetable is transported between two cleats of the set of cleats when the leafy vegetable is transported to the first and second cutting implements on the conveyor; and
    a roller disposed vertically above the conveyor in the trim area, wherein the roller is configured to hold the leafy vegetable against the conveyor as the first and second cutting implements trim the portions of the core and leafy ends.

2. The system of claim 1, wherein the roller is configured to fit between two of the set of cleats disposed on the conveyor.

3. The system of claim 1, wherein the space between the first and second cutting implements is adjustable, and the set distance is pre-set to define the amount of the leafy vegetable remaining after the portions of the core and leafy ends are trimmed.

4. The system of claim 1, wherein the conveyor extends from the trim area to a post-trim area, and further comprising:
    a first set of one or more nozzles located in the post-trim area to spray a rinsing liquid on cut sites on the leafy vegetable after the portions of the core and leafy ends have been trimmed.

5. The system of claim 4, wherein the conveyor is an endless belt that runs from a load area preceding the trim area to the post-trim area, and returns to the load area in a continuous loop.

6. The system of claim 1, wherein the first and second cutting implements simultaneously trim the portions of the core and leafy ends.

7. The system of claim 1, further comprising:
    a frame, wherein the conveyor, the first and second cutting implements, and the roller are attached to the frame, wherein the frame is configured to be pulled by a tractor.

8. The system of claim 1, wherein the conveyor, the first and second cutting implements, and the roller are integrated into a processing line in a processing plant.

9. The system of claim 1, wherein the first and second cutting implements are circular saws.

10. The system of claim 1, wherein the first and second cutting implements are water knives.

11. The system of claim 1, wherein the first and second cutting implements are flat knives.

12. The system of claim 1, wherein the first and second cutting implements are oriented vertically and at offset angles.

13. The system of claim 1, wherein the first cutting implement is a set of two circular saws rotating in the opposite or same directions, and wherein the second cutting implement is a set of two circular saws rotating in the opposite or same directions.

14. A system to process a leafy vegetable after being harvested, wherein the leafy vegetable has a core end and a leafy end, the system comprising:
    a conveyor to transport the leafy vegetables through a trim area;
    a first cutting implement located in the trim area to trim a portion of the core end;
    a second cutting implement located in the trim area to trim a portion of the leafy end, wherein the first and second cutting implements are spaced a set distance apart, and wherein the set distance defines an amount of the leafy vegetable remaining after the portions of the core and leafy ends are trimmed;

a set of cleats disposed on the conveyor, wherein the leafy vegetable is transported between two cleats of the set of cleats when the leafy vegetable is transported to the first and second cutting implements on the conveyor; and a flat belt disposed vertically above the conveyor in the trim area, wherein the flat belt is configured to hold the leafy vegetable against the first conveyor as the first and second cutting implements trim the portions of the core and leafy ends.

* * * * *